United States Patent
Boulton et al.

(10) Patent No.: US 8,113,740 B2
(45) Date of Patent: Feb. 14, 2012

(54) METHOD AND APPARATUS FOR CAPTURING, STORING, AND DISTRIBUTING STORM WATER

(75) Inventors: J. Brad Boulton, Fort Myers, FL (US); Steve Kingsland, Holly Springs, NC (US)

(73) Assignee: Oldcastle Precast, Inc., Auburn, WA (US)

( * ) Notice: Subject to any disclaimer, the term of this patent is extended or adjusted under 35 U.S.C. 154(b) by 320 days.

(21) Appl. No.: 12/367,186

(22) Filed: Feb. 6, 2009

(65) Prior Publication Data
US 2009/0226260 A1 Sep. 10, 2009

Related U.S. Application Data

(60) Provisional application No. 61/026,656, filed on Feb. 6, 2008, provisional application No. 61/117,000, filed on Nov. 21, 2008.

(51) Int. Cl.
*B65G 5/00* (2006.01)
(52) U.S. Cl. .......................... 405/36; 405/53; 137/236.1
(58) Field of Classification Search ............... 405/36, 405/39, 45, 53, 55; 137/236.1; 220/567.1
See application file for complete search history.

(56) References Cited

U.S. PATENT DOCUMENTS

| | | |
|---|---|---|
| 39,624 A | 8/1863 | Bainbridge |
| 617,991 A | 1/1899 | McDill |
| 1,301,024 A | 4/1919 | Wendelken |
| 1,698,079 A | 1/1925 | Wagner |
| 1,572,887 A | 2/1926 | Dale |
| 1,734,392 A | 11/1929 | Moore |
| 1,860,533 A | 5/1932 | Fredenhagen |
| 2,043,734 A | 12/1933 | Camp |
| 2,147,035 A | 2/1939 | Henderson |
| 2,900,083 A | 9/1956 | Oliver |
| 2,802,339 A | 8/1957 | Fogerty |
| 3,339,366 A | 9/1967 | Gogan et al. |
| 3,579,995 A | 5/1971 | Flynn |
| 3,645,100 A | 2/1972 | La Monica |
| 3,678,637 A | 7/1972 | Klipfel |
| 3,720,022 A | 3/1973 | Dattner |
| 3,742,660 A | 7/1973 | Bierweiler |

(Continued)

FOREIGN PATENT DOCUMENTS

EP 0780524 6/1997

(Continued)

OTHER PUBLICATIONS

FreeFlo Water Recycling Systems home page, as early as Aug. 22, 2006, available at http://www.freeflowater.com/features.html, pp. 1-2, printed on Dec. 2, 2008.

(Continued)

*Primary Examiner* — John Kreck
*Assistant Examiner* — Sean Andrish
(74) *Attorney, Agent, or Firm* — Sheridan Ross P.C.

(57) ABSTRACT

A precast concrete storm water vault comprised of modular precast concrete components is provided. More specifically, a vault is provided that consists of a perimeter of footings with integral vertical walls extending therefrom that supports precast concrete roof panels that comprise the top horizontal structural for the placement of pavers, a fill, base, or a driving surface. The storm water vault disclosed may be combined with a filtration system and has easily removable roof panels that facilitates maintenance and cleaning.

9 Claims, 11 Drawing Sheets

U.S. PATENT DOCUMENTS

| | | | |
|---|---|---|---|
| 3,778,528 A | 12/1973 | Heifetz et al. |
| 3,871,146 A | 3/1975 | Hamy |
| 3,878,656 A | 4/1975 | Duwe et al. |
| 3,882,683 A | 5/1975 | Purcell |
| 3,908,324 A | 9/1975 | Stout |
| 3,910,051 A | 10/1975 | Komisarek |
| 4,048,772 A | 9/1977 | Gaul |
| 4,050,215 A | 9/1977 | Fisher |
| 4,124,964 A | 11/1978 | Juriss et al. |
| 4,185,429 A | 1/1980 | Mendola |
| 4,194,339 A | 3/1980 | Fisher |
| 4,211,504 A | 7/1980 | Sivachenko |
| 4,220,423 A | 9/1980 | Sivachenko |
| 4,313,692 A | 2/1982 | Johnson |
| 4,314,775 A | 2/1982 | Johnson |
| 4,459,063 A | 7/1984 | Shaw |
| 4,495,131 A | 1/1985 | Del Valle |
| 4,539,780 A | 9/1985 | Rice |
| 4,564,313 A | 1/1986 | Niswander et al. |
| 4,594,024 A | 6/1986 | Jenkner et al. |
| 4,735,234 A | 4/1988 | Matiere |
| 4,761,126 A | 8/1988 | del Valle |
| 4,825,494 A | 5/1989 | King |
| 4,942,708 A | 7/1990 | Krumholz et al. |
| 4,953,280 A | 9/1990 | Kitzmiller |
| 4,969,626 A | 11/1990 | Strauch |
| 4,993,872 A | 2/1991 | Lockwood |
| 5,011,331 A | 4/1991 | Clavarino |
| 5,051,028 A | 9/1991 | Houck et al. |
| 5,103,604 A | 4/1992 | Teron |
| 5,161,912 A | 11/1992 | Schlueter et al. |
| 5,189,855 A | 3/1993 | Williams et al. |
| 5,199,233 A | 4/1993 | Fukutomi et al. |
| 5,199,819 A | 4/1993 | Matiere |
| 5,207,038 A | 5/1993 | Negri |
| 5,243,794 A | 9/1993 | Pikor |
| 5,281,053 A | 1/1994 | Matiere |
| 5,542,780 A | 8/1996 | Kourgli |
| 5,669,194 A | 9/1997 | Colasanto et al. |
| 5,697,736 A | 12/1997 | Veazey et al. |
| 5,759,415 A | 6/1998 | Adams |
| 5,810,510 A | 9/1998 | Urriola |
| 5,875,821 A | 3/1999 | Dumser et al. |
| 5,890,838 A | 4/1999 | Moore, Jr. et al. |
| 5,946,872 A | 9/1999 | Pardo |
| 6,035,585 A | 3/2000 | Boyd |
| 6,092,962 A | 7/2000 | Lee |
| 6,112,935 A | 9/2000 | Shackelford |
| 6,129,838 A | 10/2000 | Millner |
| 6,203,245 B1 | 3/2001 | Harten |
| 6,277,274 B1 | 8/2001 | Coffman |
| D454,203 S | 3/2002 | Bellavance |
| 6,361,248 B1 | 3/2002 | Maestro |
| 6,364,571 B1 | 4/2002 | Doolaege |
| 6,393,774 B1 | 5/2002 | Fisher |
| 6,401,400 B1 | 6/2002 | Elliott |
| 6,422,788 B1 | 7/2002 | Hartman |
| 6,467,995 B2 | 10/2002 | Bevilacqua et al. |
| D465,284 S | 11/2002 | Brown |
| 6,491,473 B2 | 12/2002 | Veazey |
| 6,493,996 B1 | 12/2002 | Alexander et al. |
| 6,648,549 B1 | 11/2003 | Urriola |
| 6,779,946 B1 | 8/2004 | Urriola |
| 6,939,077 B1 | 9/2005 | Hart |
| 6,942,424 B2 | 9/2005 | Charon |
| 6,962,463 B2 | 11/2005 | Chen |
| 6,991,402 B2 | 1/2006 | Burkhart |
| 7,022,243 B2 | 4/2006 | Bryant |
| 7,080,956 B2 | 7/2006 | Neden et al. |
| 7,131,161 B2 | 11/2006 | Lee |
| 7,160,058 B2 | 1/2007 | Burkhart |
| 7,168,884 B2 | 1/2007 | Hart |
| 7,182,874 B2 | 2/2007 | Allard et al. |
| 7,198,432 B2 | 4/2007 | Chen |
| 7,207,748 B1 | 4/2007 | Urban |
| 7,344,335 B2 | 3/2008 | Burkhart |
| 2005/0262778 A1 | 12/2005 | Allen et al. |
| 2006/0169648 A1* | 8/2006 | Fitzgerald ............ 210/747 |
| 2007/0031192 A1* | 2/2007 | Murfin .................. 405/43 |
| 2008/0251448 A1* | 10/2008 | Kent ..................... 210/602 |

FOREIGN PATENT DOCUMENTS

| | | |
|---|---|---|
| EP | 1522638 | 4/2005 |
| EP | 1818463 | 8/2007 |
| GB | 944064 | 12/1963 |
| GB | 2014212 | 8/1979 |
| GB | 2084227 | 4/1982 |
| GB | 2124277 | 2/1984 |
| JP | 59-126833 | 7/1984 |
| JP | 4-007432 | 1/1992 |
| JP | 05-263458 | 10/1993 |
| JP | 07-003861 | 1/1995 |
| JP | 07216970 | 8/1995 |
| JP | 07-252870 | 10/1995 |
| JP | 08-004343 | 1/1996 |
| JP | 08-120746 | 5/1996 |
| JP | 09-125468 | 5/1997 |
| JP | 07-189330 | 7/1997 |
| JP | 10-204968 | 8/1998 |
| JP | 11-178186 | 7/1999 |
| JP | 11-190058 | 7/1999 |
| JP | 2000-008467 | 1/2000 |
| JP | 2001-123519 | 5/2001 |
| JP | 2002-021170 | 1/2002 |
| JP | 2002-138561 | 5/2002 |
| WO | WO 95/12034 | 5/1995 |
| WO | WO 2006/032090 | 3/2006 |

OTHER PUBLICATIONS

"Auaflow® permeable block paving and SUDS. Formpave", Hanson Website, as early as Jul. 12, 2006, available at http://www.heidelbergcement.com/uk/en/hanson/products/block_paving_and_suds/permeable_paving_and_SUDS/aquaflow_permeable_block_paving_and_suds.htm, pp. 1-2, printed on Jun. 3, 2009.

"Block paving and SUDS. Formpave", Hanson Website, as early as Jul. 12, 2006, available at http://www.heidelbergcement.com/uk/en/hanson/products/block_paving_and_suds/block_paving_and_suds_overview.htm, pp. 1-2, printed on Jun. 1, 2009.

"Demonstration: The Stormsaver Rainwater Harvesting System", Stormsaver website, as early as Jun. 9, 2007, available at http://www.stormsaver.com/default.asp?pid=13, p. 1, printed Jun. 1, 2009.

"Education pack: The Stormsaver Rainwater Harvesting System", Stormsaver website, as early as Jun. 9, 2007, available at http://www.stormsaver.com/default.asp?pid=31, pp. 1-2, printed on Jun. 1, 2009.

"Features", FreeFlo Water Recycling Systems website, as early as Aug. 22, 2006, available at http://www.freeflowater.com/features.html, pp. 1-2, printed on Dec. 2, 2008.

"Formpave Image Gallery", Hanson Website, as early as Jul. 12, 2006, available at http://www.heidelbergcement.com/uk/en/hanson/products/block_paving_and_suds/formpave_image_gallery.htm, pp. 1-4, printed on Jun. 3, 2009.

"Formpave Q24 Sustainable Urban Drainage System", Hanson website, as early as, available at http://www.heidelbergcement.com/NR/rdonlyres/873FFE50-10CF-4ADE-B5AE-F3A389FE9023/0/q24.pdf, p. 1, printed on Jun. 1, 2009.

"Future water strategy. Formpave", Hanson Website, as early as Jul. 12, 2006, available at http://www.heidelbergcement.com/uk/en/hanson/products/block_paving_and_suds/future_water_strategy.htm, p. 1, printed on Jun. 1, 2009.

"How FreeFlo Water Recycling Systems Work", FreeFlo Water Recycling Systems website, as early as Aug. 22, 2006, available at http://www.freeflowatercom/how_it_works.html, pp. 1-2, printed on Dec. 2, 2008.

"How is a System Designed?" Stormsaver website, as early as Jun. 9, 2007, available at http://www.stormsaver.com/default.asp?pid=2, p. 1, printed on Jun. 1, 2009.

"Installation: The Stormsaver Rainwater Harvesting System", as early as Jun. 9, 2007, available at http://www.stormsaver.com/default.asp?pid=6, p. 1, printed on Jun. 1, 2009.

"Photo Gallery", FreeFlo Water Recycling Systems website, as early as Aug. 22, 2006, available at http://www.freeflowater.com/gallery.html, pp. 1-4, printed on Dec. 2, 2008.

"Precast Concrete Modular Storm Water Detention", StormTrap® website, as early as Mar. 23, 2008, available at http://www.stormtrap.com/, pp. 1-2, printed on Aug. 29, 2007.

"Stormsaver: Rainwater Harvesting in Commercial Buildings", Stormsaver website, as early as Jun. 9, 2007, available at http://www.stormsaver.com/default.asp?pid=7, p. 1, printed on Jun. 1, 2009.

"Stormsaver: Rainwater Harvesting in Housing Developments", Stormsaver website, as early as Jun. 9, 2007, available at http://www.stormsaver.com/default.asp?pid=10, pp. 1-2, printed on Jun. 1, 2009.

"SWPPP for Drivers Stormwater Pollution Prevention Plans", Sierra Ready Mix Website, as early as May 3, 2001, available at http://www.sierrareadymix.com/swpp.htm, pp. 1-2, printed on Nov. 19, 2008.

"The Stormsaver System", Stormsaver website, as early as Jun. 9, 2007, available at http://www.stormsaver.com/default.asp?pid=30, p. 1, printed Jun. 1, 2009.

"The Two-Piece Box Cilvert", Precast Solutions Magazine on precast.org website, as early as Mar. 9, 2007, available at http://www.precast.org/publications/solutions/2006_fall/two_culvert.htm, pp. 1-3, printed on Jun. 1, 2009.

"Water harvesting system components details. Formpave", Hanson Website, as early as Jul. 12, 2006, available at http://www.heidelbergcement.com/uk/en/hanson/products/block_paving_and_suds/water_harvesting/water_harvesting_system_components.htm, pp. 1-2, printed on Jun. 1, 2009.

"Water harvesting system details. Formpave", Hanson Website, as early as Jul. 12, 2006, available at http://www.heidelbergcement.com/uk/en/hanson/products/block_paving_and_suds/water_harvesting/water_harvesting_system_details.htm, p. 1, printed on Jun. 1, 2009.

"Welcome to RainEscape-SE", Rain Escape website, as early as 2008, available at http://www.rainescape-se.com/, p. 1, printed on Dec. 2, 2008.

"Welcome to Stormsaver Rainwater Harvesting Systems!", Stormsaver website, as early as Feb. 28, 2004, available at http://www.stormsaver.com/, pp. 1-2, printed on Jun. 1, 2009.

"What Exactly is Rainwater Recovery?", Stormsaver website, as early as Jun. 9, 2007, available at http://www.stormsaver.com/default.asp?pid=25, p. 1, printed on Jun. 1,2009.

* cited by examiner

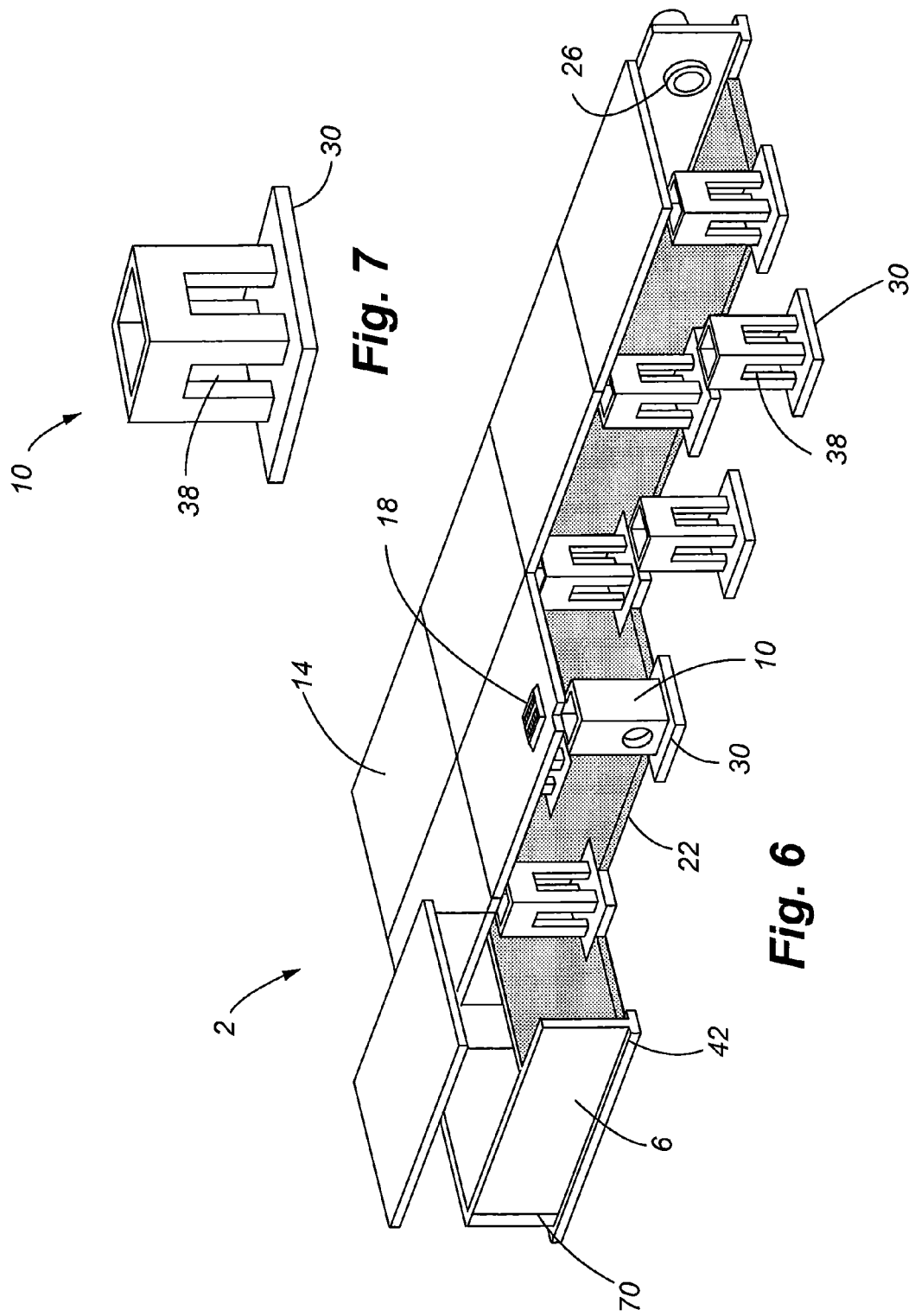

METHOD AND APPARATUS FOR CAPTURING, STORING, AND DISTRIBUTING STORM WATER

This application claims the benefit of U.S. Provisional Patent Application Ser. Nos. 61/026,656 and 61/117,000, filed Feb. 6, 2008 and Nov. 21, 2008, respectfully, the entire disclosures of which are incorporated by reference herein.

FIELD OF THE INVENTION

Embodiments of the present invention are generally related to methods and apparatus for capturing, storing, and distributing storm water. In addition, one embodiment of the present invention employs devices for treating storm water that is to be used for irrigation, for example.

BACKGROUND OF THE INVENTION

Storm water collection systems are commonly used to capture excess rain and ground water from a variety of surfaces including, paved streets, parking lots, sidewalks, and roofs. Typically, storm water collection systems are fed by street gutters, grates, or drains and vary in size. Conventional storm water collection systems simply gather the excess water and discharge it into a river, lake, canal, reservoir, ocean, dry well, or other recharge basin. Often, however, the amount of water will overwhelm the storm water collection system, which causes backups and localized flooding. Further, due to the scarce availability of water in many arid climates, the retention and use/redistribution of water is becoming a preferable alternative. Thus, it would be advantageous to provide a storm water retention system that prevents flooding and/or storm water waste by treating, storing, and later utilizing the water for other purposes.

SUMMARY OF THE INVENTION

It is one aspect of the present invention to provide a system for capturing, retaining, conveying and/or treating storm water. More specifically, in one embodiment a storm water vault is provided that includes one or more modular precast components that captures and retains storm water. One embodiment of the present invention is comprised of an exterior perimeter wall having a plurality of columns positioned therein. A plurality of roof panels are also provided and supported by at least the exterior wall and a column. Alternative embodiments omit individual columns and utilize individual vaults which have at least two walls and an integral deck, and which are designed to be used in combination with other individual vaults. The roof panels may include curb details and/or side-walk details and retention systems to direct or redirect the flow path of water to optimize collection. Alternatively, overlays, such as pavers, permeable pavers, dirt, gravel, asphalt or other materials may be placed above the roof panels, thereby concealing the vault and providing an aesthetic surface. Roof panels preferably include a grate to provide a fluid flow path into the vault. Alternatively, permeable pavers may be used to allow water to ingress into the retention vault.

With respect to the retention system, one embodiment of the present invention employs a plurality of columns to support one or more roof panels of the vault. The columns may be cylindrical, prismatic, or any other practical geometric shape. In addition, the columns may be solid, hollow, or a combination thereof. Hollow columns are desirable due to their reduced weight and have the added benefit of possibly providing a fluid flow path therethrough, which will be described in further detail below. It is envisioned that the columns, walls and roof panels may be constructed of a precast concrete material.

It is another aspect of the present invention to provide roof panels and/or walls that selectively provide access to the internal portions of the storm water vault. More specifically, access to prior art underground systems is typically gained through a manhole or limited access hatch openings wherein cleaning and equipment installation is limited. Conversely, embodiments of the present invention employ easily removable roof panels that facilitate the access of personnel equipment to improve safety and enhance maintenance. It is contemplated that the roof panel can be removed and cleaning mechanisms added into the vault. Such panels may generally include pick points or other known devices to facilitate interconnection with lifting cables or chains. One of skill in the art will appreciate that lifting jacks, for example, may be integrated into the vault that are used to selectively lift the roof panel.

It is another aspect of the present invention to provide a vault associated with a water treatment mechanism. As mentioned above, some of the columns used to support the roof panels may be at least partially hollow that are placed in operable communication with a grate, or other device integrated into the roof panel. As water flows through the grate it will enter the column and discharge through an outlet formed in the column to fill the storm water vault. Thus, some embodiments of the present invention may employ columns with an integrated filtration device. For example, Vortechs® Storm Water Treatment System, which is described in U.S. Pat. No. 5,759,415, and which is incorporated by reference herein, may be used in conjunction with the columns to provide filtration. Flo-gard® Dual Vortex Hydrodynamic Separator for Storm Water Treatment, which is described in U.S. Pat. No. 7,182,874, which is incorporated by reference herein, may also be employed. A "BaySaver" Storm Water Treatment System or other similar devices may also be used. Embodiments of the present invention may also employ the Jellyfish™ and/or Sorbfilter™ system sold by Imbrium. One of ordinary skill in the art will appreciate that various storm water treatment filtration and particle separation devices may be used in conjunction with various embodiments of the present invention. Such a water treatment device may also be included in numerous other locations within the vault, adjacent to the vault, or may be used in conjunction with the vault.

It is yet another aspect of the present invention to provide a storm water vault that includes additional water quality treatment devices. Embodiments of the present invention may also include sand filters, baffle boxes, oil separators, or other filtering devices known in the art in addition to the particulate filtration devices described above. Embodiments of the present invention also may employ a gravel filter base which may include medias like Sorbtive™ to remove specific pollutants.

It is another aspect of the present invention to provide a storm water vault that is customizable. More specifically, as briefly mentioned above, the components used to construct the storm water vault are preferably made of a precast concrete material. As a consequence, the components may be scaled in size and shape to fit any particular building requirement.

It is another aspect of the present invention to provide a storm water vault that may be used in multiple ways. More specifically, one embodiment of the present invention is used for the collection of surface storm water. Yet another embodiment of the present invention is used for groundwater recharge, i.e. exfiltration. Yet another embodiment of the present invention is used for the collection, filtration or hydrodynamic treatment of the storm water.

It is still yet another aspect of the present invention to provide system that may be positioned under various overlays. More specifically, some embodiments of the present invention are contemplated to be used with asphalt, gravel, and/or earth, which will be succinctly shown in the figures described below. Other embodiments of the present invention, however, are to be used with pavers or other surface applications that are either permeable or substantially impermeable. That is, a plurality of smaller pavers that allow for fluid to drain through or between adjacent pavers may be used independently of or in conjunction with the roof panels. This system may alleviate the need for grating or other mechanisms, wherein fluid accumulates between individual pavers and permeates into the storm water vault via seams, cracks or other mechanisms below the pavers. The overlay may incorporate permeable pavers directly applied to the roof panels or on a gravel overlay. With reference to the latter configuration, the gravel base may incorporate a filter material, such as Sorbtive™ or other media, that specifically targets and absorbs certain pollutants, such as oil, gasoline, phosphorous, nitrogen and other hydrocarbons or chemicals which may leak from parked cars, delivery trucks, etc.

It is another aspect of the present invention to provide a storm water vault that provides storage for future use. More specifically, it is contemplated that the water is stored and/or treated for indefinite periods of time and subsequently used for irrigation and/or emergency fire protection. One skilled in the art will also appreciate that the storm water vault may be employed as simply as a retention device to prevent flooding, and incorporates an impermeable floor to allow for the gradual infiltration of water into the earthen material. This embodiment may include a pumping mechanism for transferring fluid from the vault to the irrigation system, for example. The pumping mechanism also selectively transfers fluid from the vault to prevent overfilling. Accordingly, a fluid level sensing device, such as a float or other mechanical or electrical-mechanical device, may be employed wherein the pump will engage if the fluid level within the vault reaches a predetermined level similar to a sump pump. Further embodiments of the present invention include sumps or sump holes.

As mentioned above, one embodiment of the present invention employs a permeable roof to permit storm water to pass into the vault. The permeable lid provides means for directly transporting the storm water into the vault. As water flows through the permeable lid it will enter into and fill the storm water vault. It is also envisioned that at least a portion of the walls be permeable to further facilitate the movement of storm water to the vault.

It is yet another aspect of the present invention to provide a storm water system that stores water for future use and distributes the water to specified destinations. More specifically, a distribution mechanism is provided that may include but is not limited to a storage tank, a filter pump, piping, tubing, or other transport means. Once the storm water is treated the water may be stored in a storage tank to be used for a variety of future uses, including irrigation, emergency fire protection, and municipal water source. One skilled in the art will also appreciate that the storm water system may be employed as a temporary retention device to prevent flooding.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description given below, serve to explain the principles of these inventions.

FIG. 6 is a partial perspective view of the storm water vault of another embodiments of the present invention;

FIG. 7 is a perspective view of a column employed by the storm water vault shown in FIG. 6;

Figure 1:
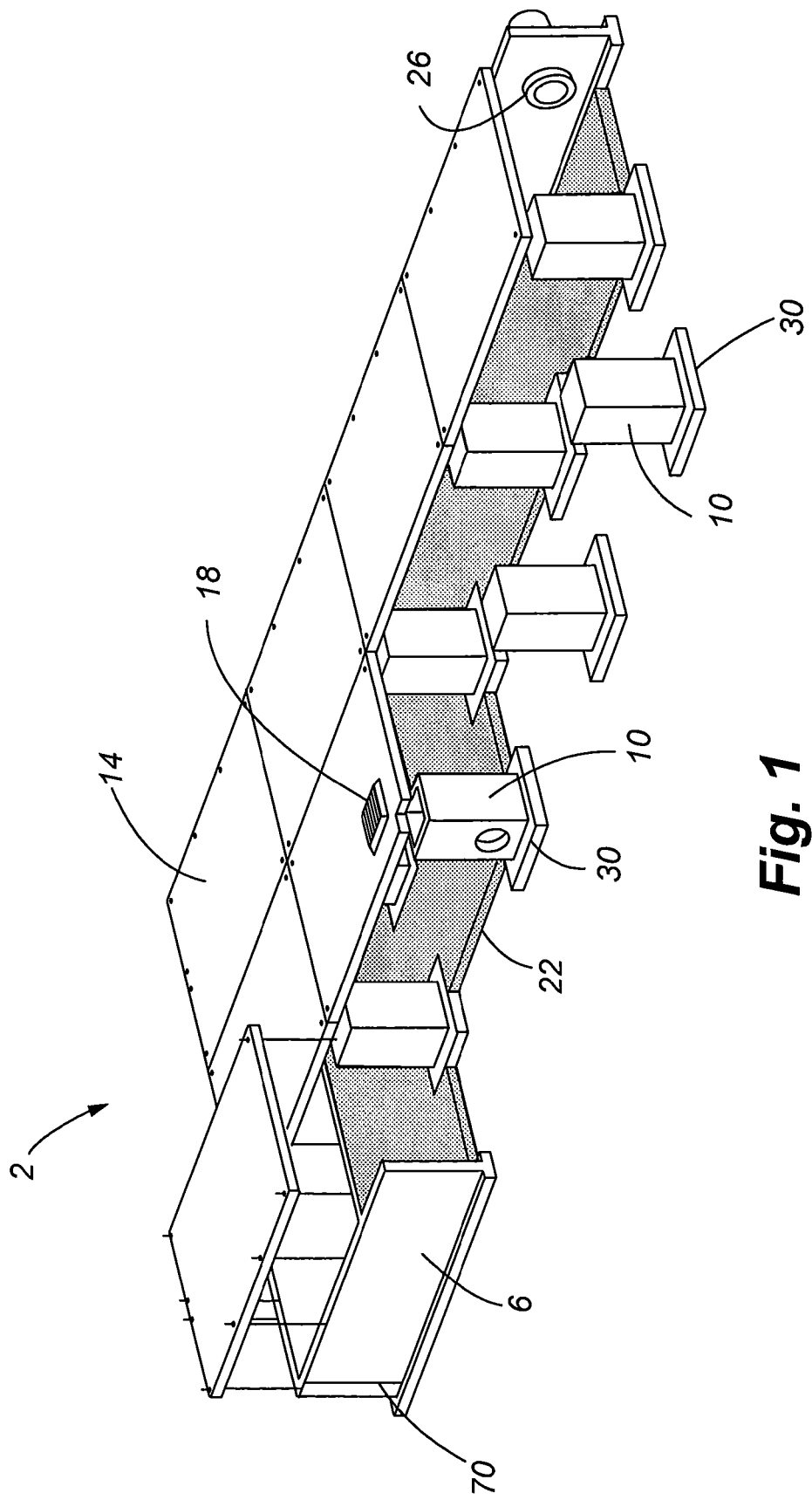
FIG. 1 is a partial perspective view of a storm water vault of one embodiment of the present invention.

To assist in the understanding of the present invention the following list of components and associated numbering found in the drawings is provided herein:

| # | Component |
|---|---|
| 2 | Storm water vault |
| 6 | Wall |
| 10 | Support column |
| 14 | Roof panel |
| 18 | Grate |

-continued

| # | Component |
|---|---|
| 22 | Fill |
| 26 | Inlet/Outlet |
| 30 | Base |
| 34 | Column outlet |
| 38 | Opening |
| 42 | Footer |
| 46 | Hole |
| 50 | Thru hole |
| 54 | Seal member |
| 58 | Dowel |
| 60 | Finished grade |
| 62 | Sealant |
| 66 | Overlay |
| 70 | Joint |
| 74 | Rod |
| 76 | Sump |
| 78 | Channel |
| 82 | Grout |
| 86 | Wrap |
| 90 | Lift point |
| 98 | Fluid |
| 102 | Permeable pavers |
| 106 | Asphalt |
| 110 | Weep hole |
| 114 | Grate |
| 118 | Permeable lid |
| 122 | Permeable base/materials |
| 126 | Treatment or reuse tank |
| 130 | Reuse line |
| 134 | Manhole |
| 138 | Downspout |
| 142 | Roof |
| 150 | Crosswalk |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIGS. 1-10, a storm water vault 2 of one embodiment of the present invention is shown that is comprised of a plurality of walls 6 that define a perimeter shape of a water containment system. A plurality of columns 10 are positioned within the walls 6 and support a plurality of roof panels 14. Some of the columns 10 may be hollow and in fluid communication with a grate 18 for the transportation of water from the roof panel 14 to the water containment system or storm water vaults.

Figure 8:
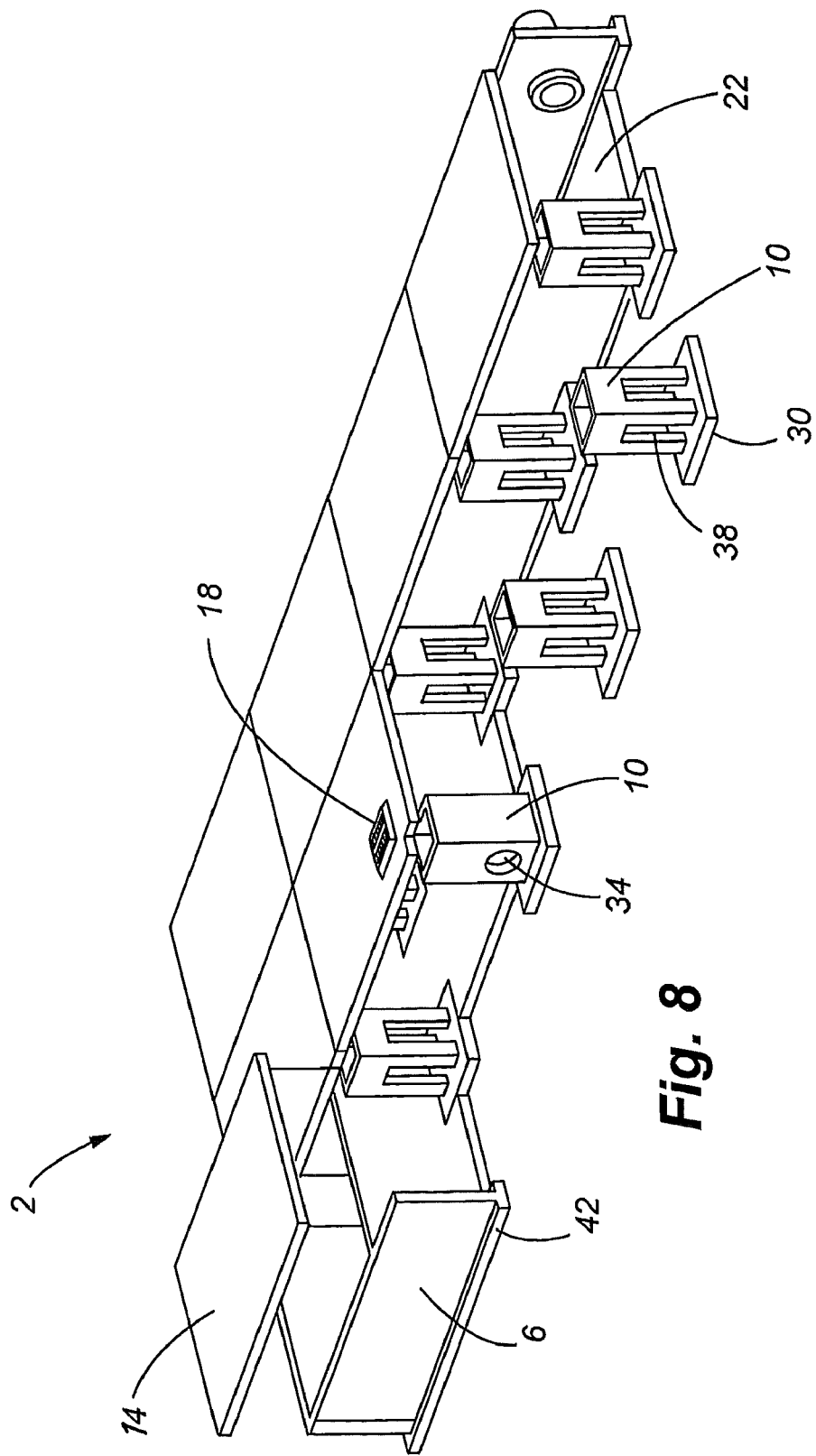
FIG. 8 is a partial perspective view of the storm water vault of another embodiment of the present invention.

The storm water vault 2 depicted in FIG. 1 includes a plurality of interconnected precast walls 6 positioned on a fill material 22 such as graded soil or gravel. The assembly shown may also rest on a non-permeable surface as shown in FIG. 8. The columns 10 support a plurality of roof panels 14 that rest on the columns 10 and/or the walls 6. At least one wall 6 may include an inlet/outlet 26 to allow fluid to ingress and egress depending on the application. The roof panels 14 in one embodiment of the present invention are made of a composite design that receives poured concrete and comprises a driving surface. Thus, the roof panel 14 may be configured to handle traffic loads with or without the incorporation of gravel, concrete or paved surfaces.

Figure 2:
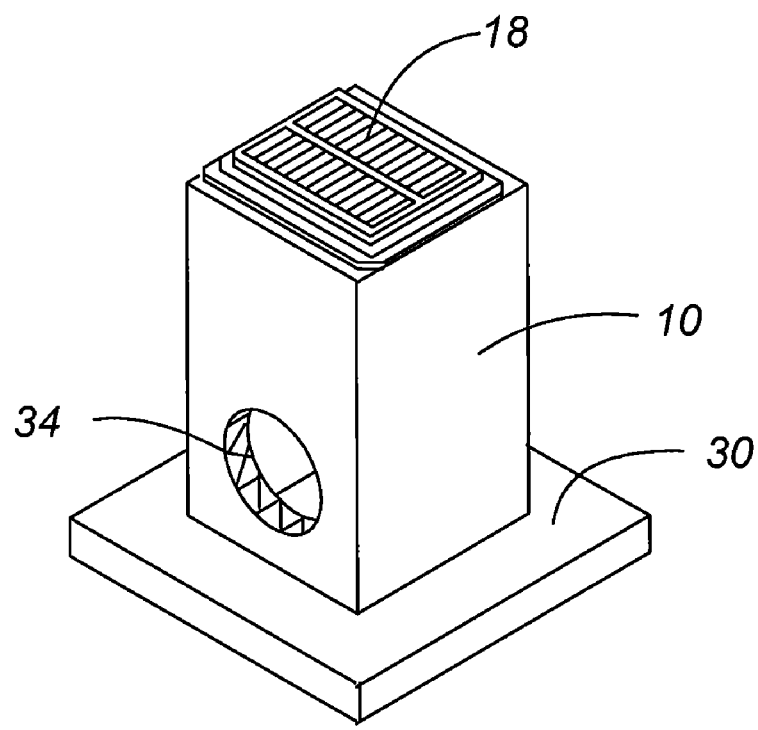
FIG. 2 is a perspective view of a column employed by the storm water vault shown in FIG. 1.

FIGS. 2 and 7 show columns 10 which depict alternative embodiments of the present invention. More specifically, the columns 10 are generally supported by a base 30 that is designed to rest on the gravel or soil surface, i.e., "fill" 22. The column 10 shown in FIG. 2 is substantially hollow wherein the grate 18 is positioned on an upper end to allow the ingress and egress of water from above the grate 18, into the column 10, out of a column outlet 34 and into the water containment system. The column 10 of FIG. 7 additionally includes a plurality of openings 38 that allow the flow of fluids therethrough. Although a prismatic column is shown, one skilled in the art will appreciate that many other shapes of columns may be employed without departing from the scope of the invention. Furthermore, it is contemplated that the column 10 may include an integrated water treatment device such as a particulate filter.

Figure 3:
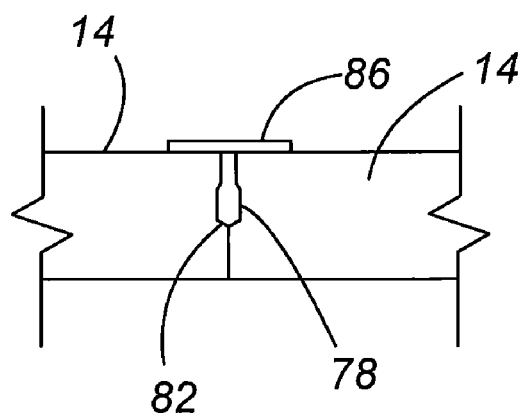
FIG. 3 is a front elevation view of the storm water vault showing the interconnection of two adjacent roof panels.

Referring now to FIG. 3, the interconnection of adjacent roof panels 14 is shown. Roof panels 14 in one embodiment include channels 78 that abut to provide a cavity for the receipt of grout 82 or other sealant. Additionally, a wrap 86 may be applied to the joint to prevent the ingress of water, which could damage the vault if frozen.

Figure 4:
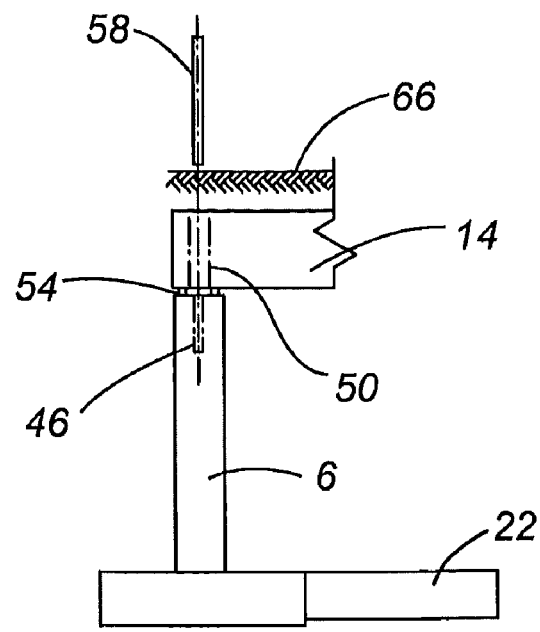
FIG. 4 is a sectional view showing the interconnection of a roof panel of the storm vault to a wall thereof.

Referring now to FIG. 4, a wall 6 of one embodiment of the present invention is shown. The wall 6 includes a footer 42 that rests on the fill 22, or adjacent thereto. Preferably, the fill 22 is comprised of a pea gravel or other granular material. Embodiments of the present invention, however, may also employ a filtering fill with varying sizes of gravel or rock material to selectively control the relative permeability of flow therethrough. The walls 6 of some embodiments of the present invention may include a tapped hole 46, i.e., blindhole associated with an upper edge thereof. The tapped hole 46 is designed to align with a thru-hole 50 provided in the roof panel 14 to receive a dowel 58. Seal members 54 may also be placed between the roof panel 14 and the wall 6. The dowel 58 is comprised of a rigid material such as re-bar, is then placed located in the thru-hole 50 of the roof panel 14 and into the tapped hole 46 of the wall 6. The dowel 58 substantially prevents translational motion between the roof panel 14 and the wall 6. A sealant 62 may also be applied to the thru-hole 50 to firmly secure the dowel 58 in the tapped hole 46. After the dowel 58 has been placed, the assembly is brought to finish grade 60 by the addition of an overlay 66. The thru-hole 50 may employ a female insert that is cast into the wall 6 or roof panel 14. The female insert is designed to receive a male, threaded portion of the dowel 58 to provide a continuous structural connection. In addition, the dowel may be of such a length to extend above the roof panel 14 for interconnection to rebar of the sidewalk or other surface positioned above the vault 2. This configuration provides additional manufacture and assembly tolerance.

Figure 5:
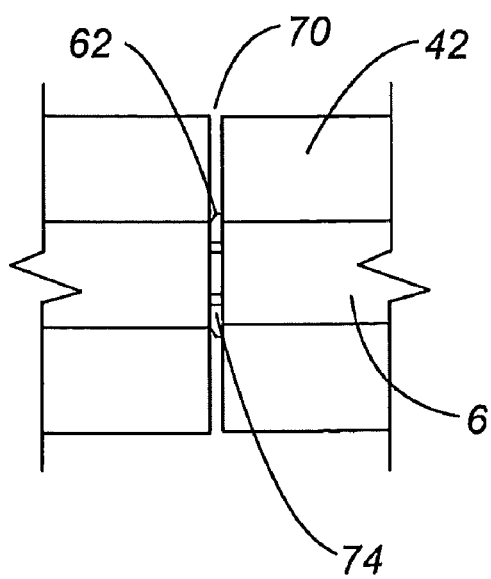
FIG. 5 is a top elevation view showing the interconnection of two adjacent walls.

Referring now to FIG. 5, a joint 70 defined by two adjacent walls 6 is shown. Here, two adjacent walls are brought together and spaced by at least one rod 74. Thereafter, a sealant 62 is injected between the walls 6 to create a generally water tight structure.

Referring now to FIGS. 6-8, one embodiment of the invention similar to that shown in FIGS. 1-5 is provided. Here, a plurality of columns 10 employ an opening 38 that facilitates the multi-directional flow of fluid. The columns 10 shown also are cost effective such that less concrete is needed to create a vault 2. Further, the nature of the columns 10 allow the storage of additional fluid. Preferably, the column bases 30 rest on a fill material 22, such as gravel. Alternatively, as shown in FIG. 8, a non-permeable material, such as concrete, may be used instead of fill and placed adjacent to the column bases 30.

Figure 9:
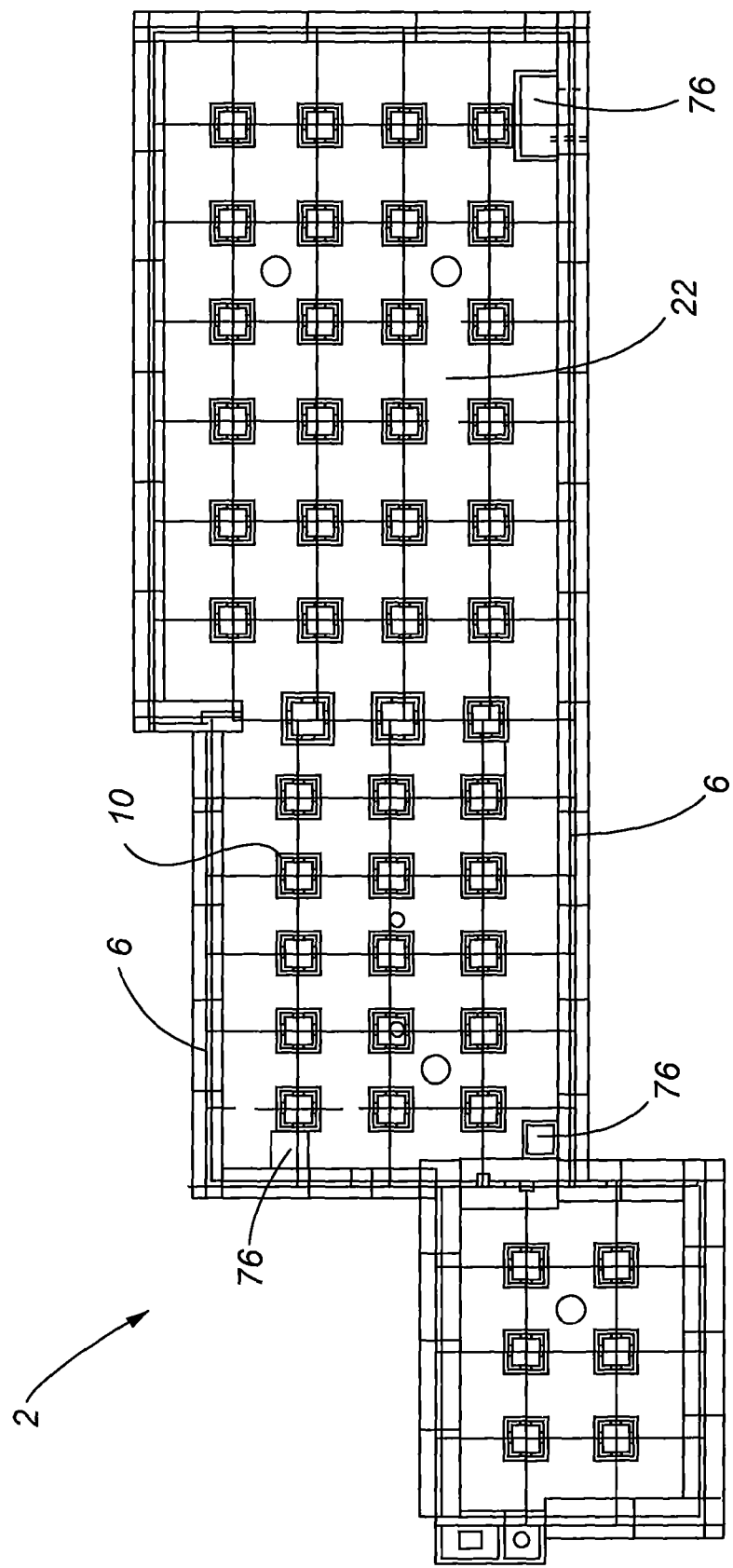
FIG. 9 is a top plan view of the storm water vault of embodiments of the present invention.
Figure 10:
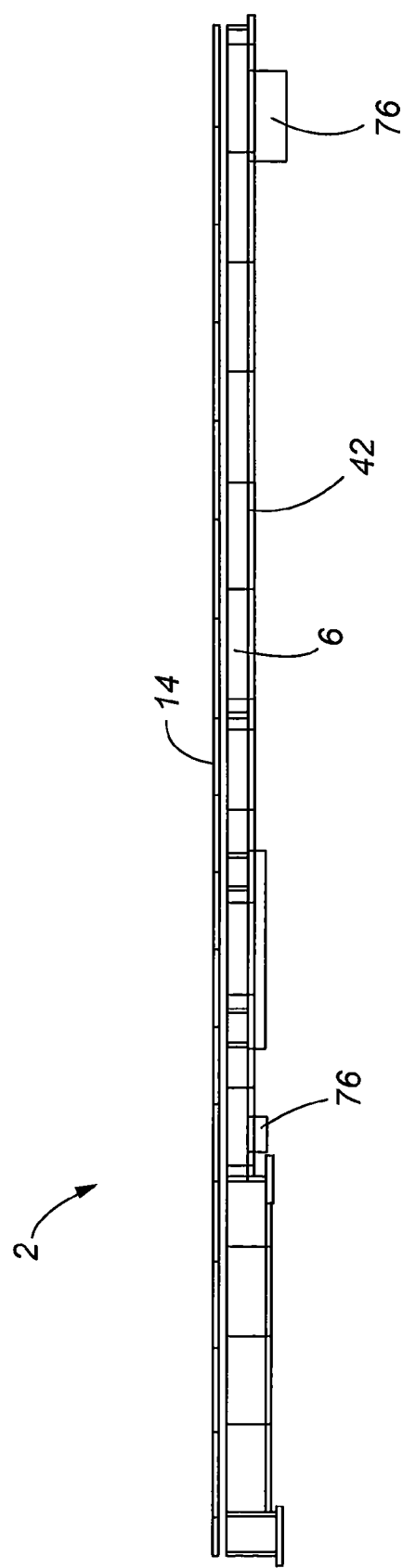
FIG. 10 is a side elevation view of the storm water vault of embodiments of the present invention.

Referring now to FIGS. 9 and 10, a storm water vault 2 of one embodiment of the invention is shown. The vault 2 may include at least one sump 76. The walls 6 of the vault 2 define a storm water storage volume.

Figure 13:
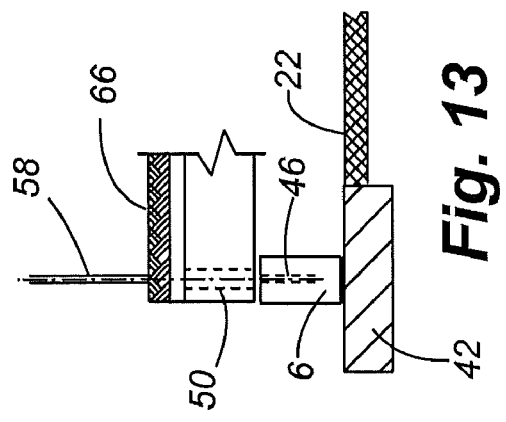
FIG. 13 is a sectional view of FIG. 11 showing the interconnection of the roof panel to the wall.
Figure 11:
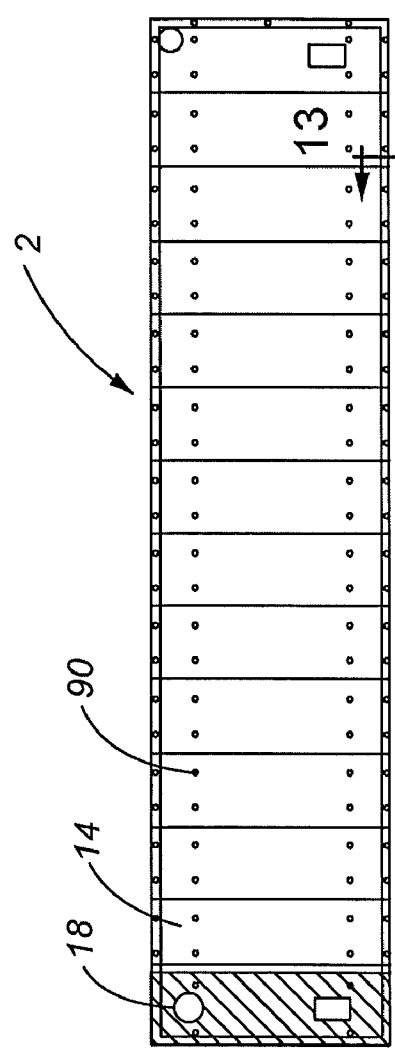
FIG. 11 is a top plan view of a storm water vault of another embodiment of the present invention.
Figure 12:
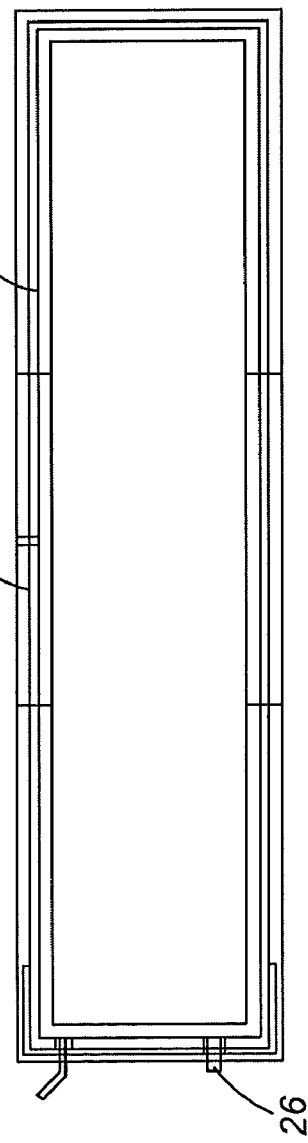
FIG. 12 is a top plan view similar to FIG. 11 wherein the roof panels have been omitted for clarity.

Referring now to FIGS. 11-13, yet another embodiment of the present invention is shown. More specifically, a wall 6 having a footer 42 defines a water containment volume of the storm water vault 2. A plurality of roof panels 14 is added to a top surface of the wall 6. The roof panels 14 are also joined to the wall via a retention pin or dowel 58 that is placed in a thru-hole 50 provided in the roof panel 14 and a tapped hole 46 positioned in the wall 6. Fill 22 also may be used within the containment volume provided by the wall 6. In addition, overlay 66 may be added above the roof panel 14 to conceal the storm water vault 2. The roof panels 14 may also include a grate 18 or other opening that allows the ingress of water. Furthermore, the roof panel 14 may include at least one lift point 90 to facilitate the transportation and placement of the roof panels 14.

Figure 14:
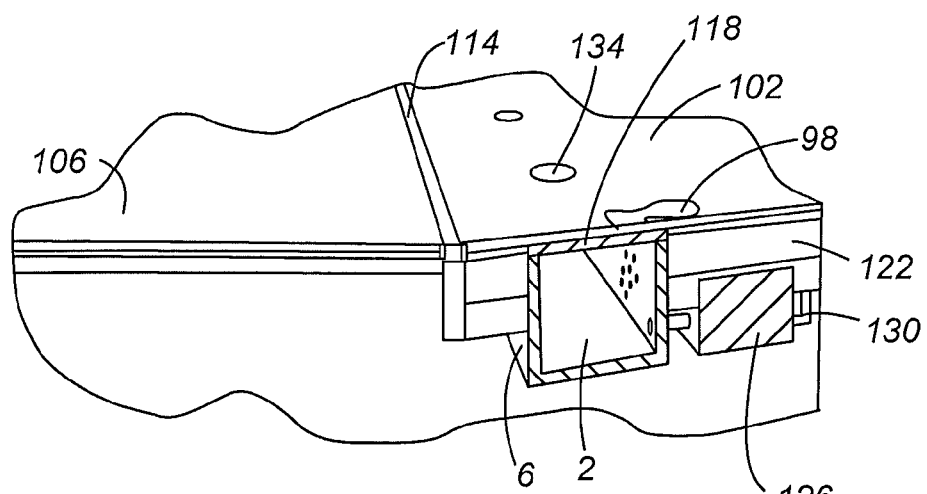
FIG. 14 is a cross-sectional perspective view of a system for capturing, storing, treating and distributing storm water of one embodiment of the present invention.
Figure 15:
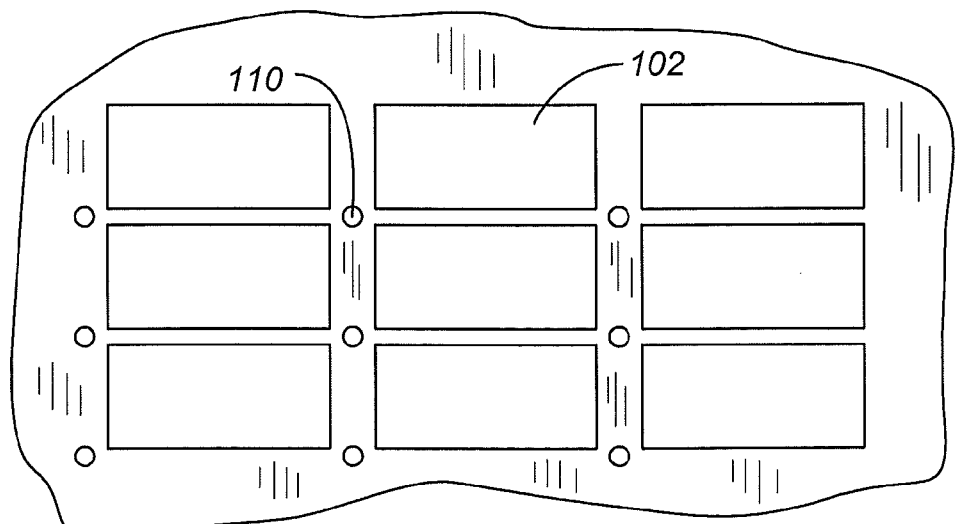
FIG. 15 is a is a partial top plan view of FIG. 14, showing the permeable surface structure of one embodiment of the present invention.

Referring now to FIGS. 14 and 15, a system for capturing, storing, and distributing storm water 98 in another embodiment of the present invention is shown. More specifically, water 98 is collected from both permeable 102 and non-permeable 106 (i.e., asphalt) surfaces. For example, the storm water system of the present invention may collect storm water 98 from non-permeable structures 106, such as parking lots, rooftops, sidewalks, and paved streets. Moreover, embodiments of the present invention are integrated into and under a commercial parking lot that includes a permeable surface structure 102 and a sub-surface storm water vault 2.

The permeable surface structure is specifically shown in FIG. 15 and comprises a plurality of permeable pavers 102 and a plurality of weep holes 110. The permeable pavers 102 transport the storm water from the surface to the sub-surface vault 2. As the storm water passes through the permeable pavers 102 the water will be captured inside the vault 2 below. The permeable pavers 102 may be made of any material which is permeable to water, such as porous concrete, plastic, gravel, or other permeable hardscape flooring material. One of skill in the art will appreciate that any size or shape of permeable paver may be utilized for this purpose. In the embodiment shown, weep holes 110 are employed to further facilitate water drainage between adjacent pavers. One of skill in the art will appreciate that any number of permeable pavers 102 and weep holes 110 may be utilized and configured depending on a variety of factors, such as amount of rain fall, surface size, and aesthetics. One skilled in the art will also appreciate that other permeable overlays may be employed to transport storm water to the vault.

In one embodiment of the present invention, a surface grate 114 is also employed to capture and remove excess or run-off storm water. The grate 114 is provided to further facilitate the transport of storm water into the vault 2 via an inlet positioned beneath the drainage pipe (not shown) that is interconnected to the vault 2. As the storm water encounters the grate 114, the water is channeled into the drainage pipe and then transported and deposited into the vault 2. Thus, when there is substantial surface water, such as during a heavy rain storm, the grate 114 captures any excess surface storm water not absorbed by the permeable pavers 102 and/or a permeable lid 118. Embodiments of the present invention also employ multiple surface grates 114 to further enhance the water collection capability of the system. A network of interconnected grates may also be used to further filter debris from the storm water.

Referring again to FIG. 14, the sub-surface storm water vault 2 is comprised of a plurality of exterior walls 6 and a permeable lid 118 that form a compartment capable of capturing and retaining storm water 98. The permeable lid 118 is supported by the plurality of exterior walls 6. One skilled in the art will appreciate that the permeable lid 118 may be selectively interconnected to the external walls by any number of securing mechanisms. The vault 2 is positioned generally vertically below the permeable surface structure 102. Thus, in one embodiment of the present invention, the vault 2 is positioned fully underground. However, one skilled in the art will appreciate that the vault 2 could also be positioned partially underground. Overlay 66, such as pavers, dirt, gravel, or asphalt may be placed above the permeable lid, thereby concealing the vault 2. As water flows through the permeable pavers 102 and through the permeable lid 118, the storm water enters into and fills the vault 2. The storm water system may also include permeable base members 122 surrounding the vault to further facilitate the transport of storm water into the vault.

In one embodiment of the present invention, the storm water system employs a water treatment mechanism 126. The water treatment mechanism 126 may be comprised of an interconnected treatment tank. One of skill in the art will appreciate that any number of connecting devices, such as piping or other tubing, may be used to interconnect the vault 2 to the treatment tank 126. After water drains from the surface through the permeable structures 102 and into the vault 2, it is preferably transported through appropriate piping into a treatment tank 126. In one embodiment, the treatment tank 126 includes a separator to separate fluid and oil and any particulate matter. It is envisioned that once separated, the oil will be compartmentalized for storage and/or removal. The storm water system may also include a particle separator for removing debris and suspended particles from the storm water. The storm water system may additionally include one or more filtration devices or water treatment apparatus. One of skill in the art will appreciate that different separators and filters may be utilized to treat and remove pollutants, chemicals, fertilizers, sediment, and oils from the storm water depending on individual system requirements.

The storm water system may also include additional water quality treatment devices, such as hydrodynamic devices, SorbFilters, Jelyfish filters, sand filters, coalescing plate oil water separators, baffle style oil water separators, and other treatment devices known in the art. It is envisioned that the water treatment and/or quality devices may be included elsewhere within the storm water system. It is also envisioned that such water treatment and/or quality devices be integrated into the system so that the water flowing into the vault is treated prior to filling the storm water vault.

Embodiments of the present invention employ a distribution mechanism to distribute the storm water for a variety of end uses. The distribution mechanism may include a storage tank, a centrifugal pump, and corresponding piping to transport the water to a second or third location. In one embodiment of the present invention, a reuse line 130 is provided to transport water from the storage tank 2 to a destination where the water will be used, such as a garden center or municipal water line. A centrifugal pump is provided to pump the water out of the storage tank 2 and into and through the reuse line(s) 130. It is envisioned that the reuse line(s) 130 will provide water to a variety of end uses, such as irrigation, landscaping, horticulture and/or agriculture, emergency fire protection, and municipal water sources. Importantly, unlike prior art storm water systems where the storm water is disposed of, the present invention stores and utilizes the storm water for multiple future uses. The storm water system of the present invention provides a system for low impact development, promotes water sustainability, and provides a viable source of reusable water.

Further, one embodiment of the present invention includes manholes 134, or other limited access openings, that selectively provide access to the internal portion of the storm water system. The manholes 134 facilitate the access of personnel and equipment and provide access to the system for cleaning, equipment installation, maintenance, and repairs. Underground access is governed by OSHA regulations under confined space guidelines.

Figure 16:
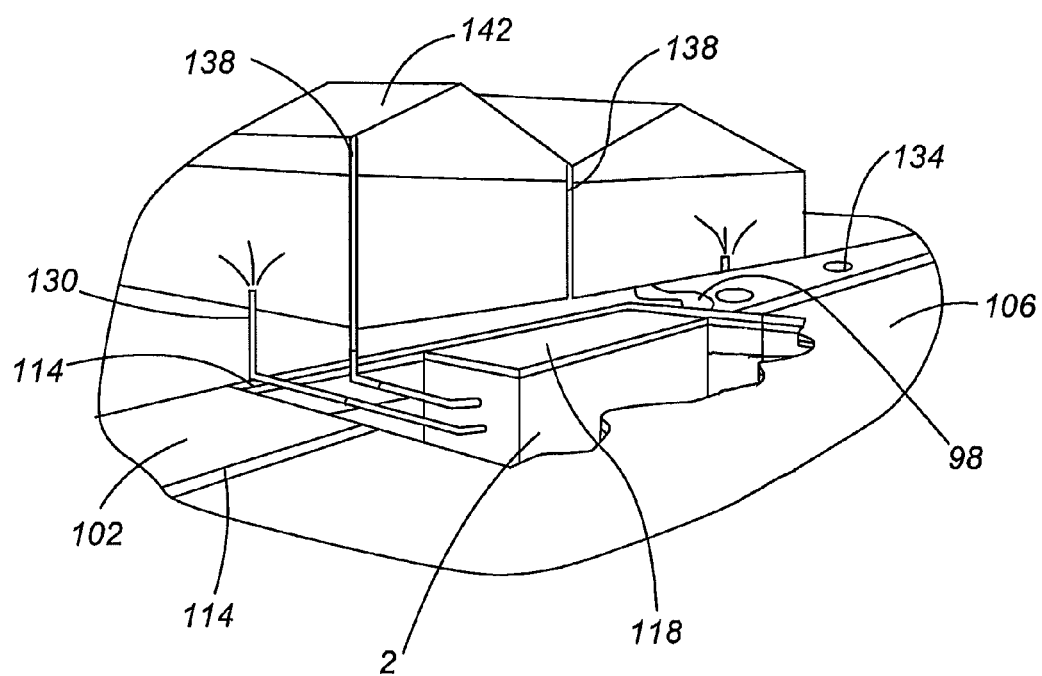
FIG. 16 is a partial perspective view of a system for capturing, storing, and distributing storm water of another embodiment of the present invention.

Referring now to FIG. 16, another embodiment of the present invention is shown. This embodiment of the present invention is very similar to that previously described such that the storm water system is comprised of a permeable surface structure 102 and a sub-surface storm water vault 2 that are integrated into a commercial parking lot. In this embodiment of the present invention, a plurality of downspouts 138 are employed to capture storm water from above-surface structures, such as a roof 142. The downspouts 138 facilitate the removal and collection of storm water and are positioned along an above-surface structure and are interconnected to the storm water vault 2 via piping and/or tubing. The downspouts 138 reduce the amount of overhead storm water runoff and increase the amount of reusable water collected. In the embodiment shown, the storm water vault, treatment tank, and storage tank are contained within a single underground housing compartment.

Figure 17:
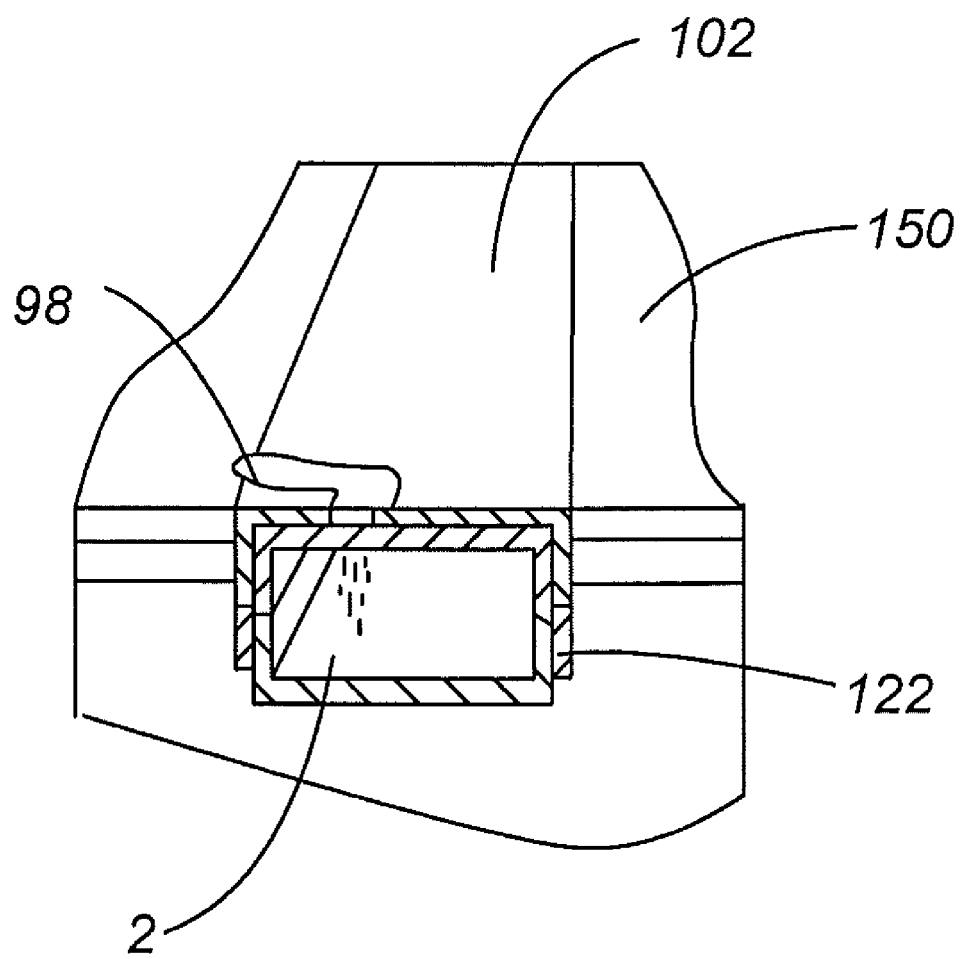
FIG. 17 is a cross-sectional perspective view of a system for capturing, storing, and distributing storm water of another embodiment of the present invention.

Referring now to FIG. 17, yet another embodiment of the present invention is shown. More specifically, the storm water system is integrated into a crosswalk 150 or other roadway. The embodiment shown includes a permeable surface 102 structure and sub-surface storm water vault 2. One skilled in the art will appreciate that the afore-mentioned features can be sized appropriately for positioning below a crosswalk 154 or other roadway in order to accommodate other sub-surface devices such as water, gas, and electrical lines.

While various embodiments of the present invention have been described in detail, it is apparent that modifications and alterations of those embodiments will occur to those skilled in the art. However, it is to be expressly understood that such modifications and alterations are within the scope and spirit of the present invention as set forth in the following claims.

What is claimed is:

1. A system for capturing, storing, and distributing rain water in a subterranean location, comprising:

a permeable surface structure positioned above at least one storage vault which is in operable communication with said at least one storage vault;

a treatment device associated with said at least one storage vault that removes contaminants from the rain water;

a distribution system capable of selectively distributing the rain water from said at least one storage vault to one or more locations;

wherein said at least one storage vault comprises exterior walls that support at least one roof panel to define a containment volume, said at least one roof panel being permeable; and said at least one roof panel additionally supported by a column, said column including a grate for receiving the rain water.

2. The system of claim 1, wherein said at least one roof panel is selectively removable from said exterior walls.

3. The system of claim 1, further comprising a manhole that provides access to said at least one storage vault through at least one of said permeable surface structure and said at least one roof panel.

4. The system of claim 1, wherein said treatment device is integral with said column.

5. The system of claim 1, wherein said permeable surface structure comprises a plurality of permeable pavers.

6. The system of claim 1, wherein said treatment device is positioned away from said at least one storage vault, said treatment device further comprising a conduit for transferring the rain water from said treatment device to another location.

7. The system of claim 1, wherein said at least one storage vault is associated with a fluid conduit that receives the rain water through the grate.

8. The system of claim 1, wherein said permeable surface structure is comprised of a plurality of spaced pavers with weep holes located therebetween.

9. The system of claim 1 wherein said at least one storage vault receives the rain water from at least one downspout.

\* \* \* \* \*